United States Patent Office 3,534,047
Patented Oct. 13, 1970

3,534,047
N-PHENACYL AND N-NAPHTHACYL-dl- AND
l - TROPYL TROPATES AND DERIVATIVES
THEREOF
Uberto Teotino and Davide Della Bella, Milan, Italy, assignors to Whitefin Holding S.A., Lugano, Switzerland
No Drawing. Continuation-in-part of application Ser. No. 537,663, Mar. 28, 1966. This application May 25, 1967, Ser. No. 641,170
Claims priority, application Great Britain, Mar. 16, 1966, 11,439/66
Int. Cl. C07d 43/06
U.S. Cl. 260—292
4 Claims

ABSTRACT OF THE DISCLOSURE

New tropyl tropate derivatives of the general formula:

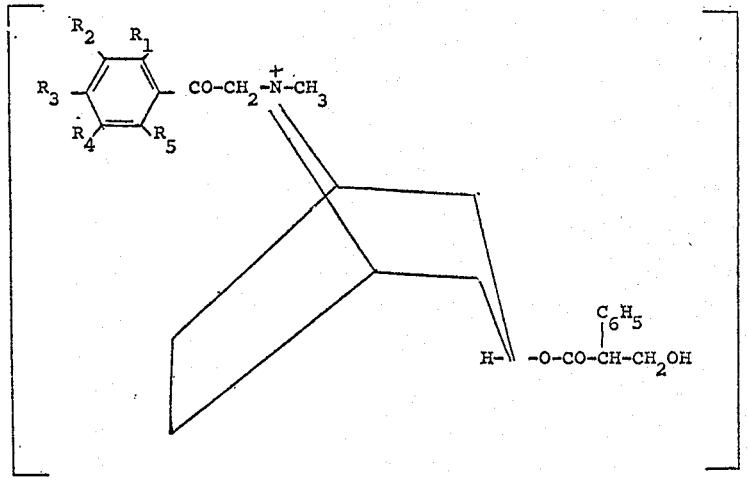

wherein

X is a halogen atom and
$R_1$, $R_2$, $R_4$ and $R_5$ are the same or different and represent a hydrogen or halogen atom or an alkyl, phenyl, alkylmercapto, alkylsulphonyl, nitro, alkoxy, hydroxy, amino, monoalkylamino or dialkylamino group and $R_3$ is hydrogen atom or an alkyl, alkylmercapto, alkylsulphonyl, nitro, alkoxy, hydroxy, amino, monoalkylamino or dialkylamino group or
$R_1+R_2$ or $R_2+R_3$ together with the phenyl ring to which they are linked form a naphthyl ring, provided that at least one of the substituents $R_1$, $R_2$, $R_3$, $R_4$ and $R_5$ is different from hydrogen.

These products are useful as antispasmodic and gastric antisecretory compositions having the same order of activity as atropine, but without its undesirable side effects.

CROSS REFERENCE TO RELATED APPLICATIONS

This application is a continuation-in-part of co-pending application S.N. 537,663 filed Mar. 28, 1966, now abandoned.

This invention relates to new tropyl tropate derivatives possessing valuable therapeutic properties and the preparation thereof.

It is known that atropine is a classical powerful antispasmodic and possess gastric antisecretory activity, however the great toxicity and undesirable systemic side-effects severely limit its therapeutic applications.

Up to this time, several permutations of the molecular structure of atropine have been carried out in order to prepare a drug endowed with the same degree of antispasmodic and gastric antisecretory activity as atropine but at the same time devoid of its known side-effects such as dryness of the mouth, retention of urine, diminution or cessation of perspiration, reduction of other body secretions, dilation of pupils and disturbance of heart rhythm. Although some useful synthetic compounds have resulted from these researches there is wide recognition that such a drug has not yet been found (A. Burger, Medicinal Chemistry, page 463, Interscience Publishers Inc. N.Y., 1960).

We have now found a number of tropyl tropate derivatives which proved to possess a strong antispastic action and gastric antisecretory activity, but no undesirable effects also when administered in doses up to 7-10 times those clinically useful.

The new compounds of the present invention may be represented by the following structural formula:

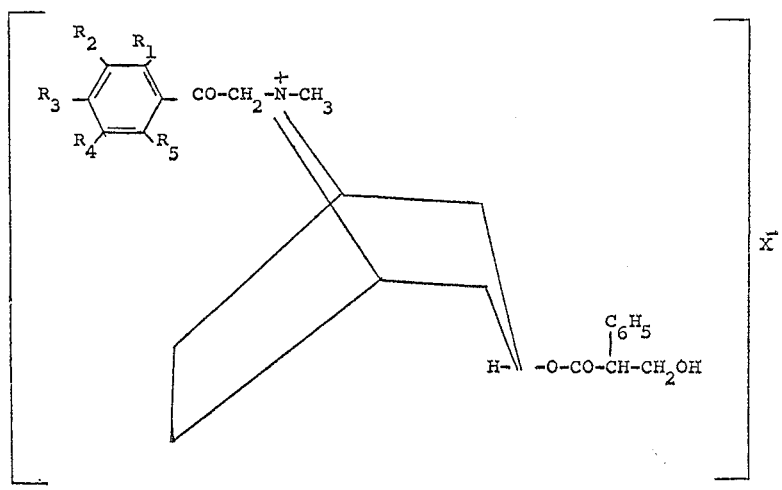

wherein X is halogen atom and $R_1$, $R_2$, $R_4$, $R_5$ are the same or different and represent a hydrogen or halogen atom or an alkyl, phenyl, alkylmercapto, alkylsulphonyl, nitro, alkoxy, hydroxy, amino, monoalkylamino or dialkylamino group and $R_3$ is hydrogen atom or an alkyl, alkylmercapto, alkylsulphonyl, nitro, alkoxy, hydroxy, amino, monoalkylamino or dialkylamino group or $R_1+R_2$ or $R_2+R_3$ together with the phenyl ring to which they are linked form a naphthyl-ring, provided that at least one of the substituents $R_1$, $R_2$, $R_3$, $R_4$ and $R_5$ is different from hydrogen.

It will be apparent to those skilled in the art that, referring only to the stero-isomeric forms of tropic acid, the quaternary ammonium compounds of the foregoing structural formula can exist in three stereo-isomeric forms.

The present invention is concerned with the derivatives of all three stereo-isomeric forms, namely dl-tropyl tropate (atropine), l-tropyl tropate (l-hyoscyamine) and d-tropyl tropate (d-hyoscyamine).

Among the tropyl tropate derivatives of this invention, the derivatives of l-tropyl tropate are preferred in view of their strong and long-lasting antispasmodic and gastric antisecretory properties. Their pharmacological features may be summarized as follows:

(a) Parasympatholytic activity is mainly exerted at level of peripheral ganglionic synapses on which they are from five to eight times as active as hexamethonium and from twelve to twenty times as tetraethylammonium. On the contrary, they are about from twenty to hundred times less effective than hexamethonium on orthosympathetic ganglionic synapses.

(b) They counteract effectively both motor and secretory activity of the gastrointestinal tract elicited by either peripheral stimulation of the vagus nerve or administration of acetyl-β-methyl choline. Salivary secretion and pupillary muscles are not affected.

(c) Blood pressure, cardiac rhythm and ECG (electrocardiographic) tracing appeared unaltered in both cat and dog following administration of doses of the derivatives up to twenty to fifty times the minimal effective one.

(d) Parasympatholytic activity of the derivatives investigated by recording bradicardia and blood pressure fall induced by stimulation of the peripheral end of the sectioned right vagus in both cat and dog, proved to be very long-lasting: 1 to 2 hours following 40mcg./kg. doses intravenously. In other animal species such as rodents, both intensity and duration of action appeared to be less significant.

(e) In man proved to possess antispasmodic and gastric antisecretory activity and were not responsible for xerostomia, mydriasis or heart rhythm disturbances. The effective dose ranging from about 1 to 30 mg.

(f) They do not possess ganglioplegic activity (g) Toxicological data of these compounds are following: $LD_{50}$ intravenously is 10-15 mg./kg. in cat (400-600 times the minimal effective dose), 11-14 mg./kg. in mouse and 10-14 mg./kg. in rat. In the case of subcutaneous and oral routes, $LD_{50}$ in mouse appeared to be higher than 500 mg./kg. Death seems to be due to respiratory muscle paralysis; heart activity is the last that disappears.

The method for preparing the compounds of the present invention comprises reacting a phenacyl halide of formula

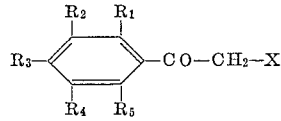

wherein $R_1$, $R_2$, $R_3$, $R_4$, $R_5$ and X are as defined above, with a tropyl tropate in the presence of an inert solvent at a temperature range of from 0°C. to 60° C. or reacting the tropine with a phenacyl halide of the above formula, condensing the product thus obtained with an O-acyl-tropic acid halide and deacylating the resulting compound.

The following examples are given to illustrate the invention.

EXAMPLES 5.80 g. (0.02 mole) of p-bromophenacyl bromide were dissolved in 50 cc. of anhydrous acetone previously headed to about 40° C.

This solution was added to a stirred solution of 5.80 g. (0.02 mole) of l-hyoscyamine in 55 cc. of anhydrous acetone; thereafter the solution was maintained at 40° C. and stirred for about five hours.

After standing overnight in a refrigerator, the precipitate was collected by filtration and dried in vacuo at 45° C. Yield: 10.6 g. M.P.=225–226° C.

According to this procedure were also prepared the following compounds:

|  | M.P., ° C. |
|---|---|
| p-Bromophenacyl-dl-tropyltropinium bromide | 214–216 |
| p-Methylphenacyl-l-hyoscyaminium bromide | 205–207 |
| p-Methylphenacyl-dl-tropyltropinium bromide | 195–197 |
| o-Methylphenacyl-l-hyoscyaminium bromide | 183–185 |
| m-Methylphenacyl-l-hyoscyaminium bromide | 193–195 |
| p-Methylmercapto-phenacyl-l-hyoscyaminium bromide | 194–196 |

| | M.P., °C. |
|---|---|
| p-Methylmercapto-phenacyl-dl-tropyltropinium bromide | 186–188 |
| p-Nitrophenacyl-l-hyoscyaminium bromide | 202–204 |
| p-Nitrophenacyl-dl-tropyltropinium bromide | 196–198 |
| m-Nitrophenacyl-l-hyoscyaminium bromide | 198–200 |
| m-Nitrophenacyl-dl-tropyltropinium bromide | 188–190 |
| o-Nitrophenacyl-l-hyoscyaminium bromide dec | 206–207 |
| o,p-Dimethoxyphenacyl-l-hyoscyaminium bromide | 141–143 |
| p-Methylsulphonylphenacyl-dl-tropyltropinium bromide | 219–220 |
| p-Mhteylsulphonylphenacyl-l-hyoscyaminium bromide | 211–212 |
| 2-napthacyl-dl-tropyltropinium bromide | 184–186 |
| 2-napthacyl-l-hyoscyaminium bromide | 208–210 |
| p-Bromophenacyl-l-hyoscyaminium bromide | 225–226 |
| p-Trifluoromethylphenacyl-l-hyoscyaminium bromide | 195–197 |
| o-Nitrophenacyl-dl-tropyltropinium bromide dec | 205–206 |
| p-Iodophenacyl-dl-tropyltropinium bromide dec | 221–223 |
| p-Iodophenacyl-l-hyoscyaminium bromide dec | 224–226 |
| m-Methylphenacyl-l-hyoscyaminium bromide | 193–195 |
| o-Methylphenacyl-dl-tropyltropinium bromide | 160–162 |
| p-Methylmercaptophenacyl-l-hyoscyaminium bromide | 194–196 |
| p-Aminophenacyl-l-hyoscyaminium bromide | 213–215 |
| o-Nitro,p-chloro-phenacyl-dl-tropyltropinium bromide dec | 220–222 |
| o-Nitro,p-chloro-phenacyl-l-hyoscyaminium bromide dec | 224–225 |

The compounds of the present invention are compatible with other therapeutic agents that may be used in connection therewith, such as analgesic, sedative, tranquillising agents, antiacids, bulky constipants, and may be administered orally, subcutaneously, intravenously or rectally in any of the known pharmaceutical forms generally employed for those modes of administration.

According to the present invention the tropyl tropate derivatives may be associated with a carrier which may be either a solid material or a sterile parentheral liquid. The compositions may take the form of tablets, capsules, suppositories, vials or other dosage forms. Liquid diluents are employed in sterile condition for parental use; such a medium may be sterile water.

Reference will now be made to some specific examples showing compositions which may be prepared and used in accordance with this invention without, however, limiting the same.

EXAMPLE A

An aqueous solution for parenteral use has the following composition:

| | Mg. |
|---|---|
| p-Nitrophenacyl-l-hyoscyaminium bromide | 1.5 |
| Distilled, water q.s. ad 2 ml. | |

The vials are then sterilized for 20 minutes at 120° C.

Example B

An aqueous solution for parenteral use and containing an analgesic has the following composition:

| | Mg. |
|---|---|
| p-Bromophenacyl-l-hyoscyaminium bromide | 1.5 |
| Sodium-1-phenyl-2,3-dimethyl-5-pyrazolone-4-methylamino methanesulphonate | 1,000 |
| Double-distilled, sterile water q.s. ad 2 ml. | |

The vials are then steralized for 1 hour at 100° C.

Example C

A tablet suitable for oral administration has the following composition:

| | Mg. |
|---|---|
| p-Nitrophenacyl-l-hyoscyaminium bromide | 1.5 |
| Kaolin | 83 |
| Starch | 15 |
| Talc | 10 |
| Magnesium stearate | 10 |

The powders are mixed, granulated and tableted in the known manner.

Example D

A composition suitable for rectal use has the following composition per suppository:

| | Mg. |
|---|---|
| p-Bromophenacyl-l-hyoscyaminium bromide | 3 |
| Triesters of glycerol and fatty acids q.s. ad | 2,500 |

We claim:
1. A tropyl tropate derivative having the formula

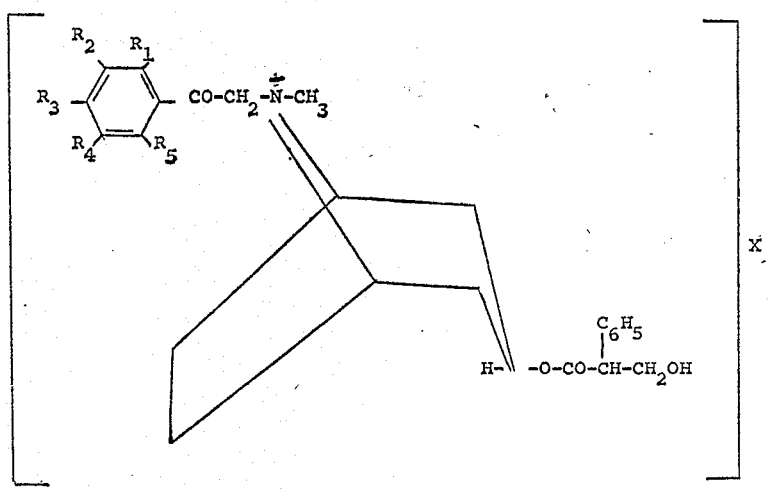

wherein X is a halogen atom, $R_1$, $R_2$, $R_3$, $R_4$ and $R_5$ are selected from the group consisting of hydrogen, halogen, methylmercapto, halomethyl, methylsulphonyl, nitro, methoxy and amino, with the proviso that at least one of $R_1$, $R_2$, $R_3$, $R_4$ and $R_5$ is not hydrogen, and wherein $R_1+R_2$ and $R_2+R_3$ together with the phenyl ring to which they are linked may form a naphthyl ring.

2. A tropyl tropate derivative as claimed in claim 1, wherein the tropyl tropate is *l*-hyoscyamine.

3. A tropyl tropate derivative as claimed in claim 1, wherein the tropyl tropate is atropine.

4. A tropyl tropate derivative as claimed in claim 1, wherein X is a bromine atom.

References Cited

UNITED STATES PATENTS 2,828,312  3/1958  Johnston et al. _____ 260—292

HENRY R. JILES, Primary Examiner

A. L. ROTMAN, Assistant Examiner

U.S. Cl. X.R.

424—265